United States Patent

Ganachaud et al.

[11] Patent Number: 5,839,489
[45] Date of Patent: Nov. 24, 1998

[54] FILLING ADAPTOR FOR A FUEL TANK

[75] Inventors: Patrick Ganachaud, Laval; Jacques Turpin, Carquefou; Eddy Maignan; Jean-Philippe Rolinat, both of Laval, all of France

[73] Assignee: Solvay (Société Anonyme), Brussels, Belgium

[21] Appl. No.: 744,862

[22] Filed: Nov. 6, 1996

[30] Foreign Application Priority Data

Nov. 6, 1995 [BE] Belgium .................................. 09500913

[51] Int. Cl.$^6$ ........................................................ B65B 1/04
[52] U.S. Cl. ........................... 141/382; 141/301; 220/86.2
[58] Field of Search ...................................... 141/382, 346, 141/348–350, 367, 285, 286, 59, 301, 307, 308; 220/86.2, 4.14; 137/587–589; 55/385.3, 385.4

[56] References Cited

U.S. PATENT DOCUMENTS

| 4,630,749 | 12/1986 | Armstrong et al. ................... 220/86.2 |
| 4,759,458 | 7/1988 | Fischer ................................... 220/86.2 |
| 4,816,045 | 3/1989 | Szlaga et al. ........................... 141/286 |
| 5,322,100 | 6/1994 | Buechler et al. ....................... 141/348 |

FOREIGN PATENT DOCUMENTS

| 0223931 | 6/1987 | European Pat. Off. . |
| 0357874 | 3/1990 | European Pat. Off. . |
| 0621153 | 10/1994 | European Pat. Off. . |
| 0645273 | 3/1995 | European Pat. Off. . |
| 0659603 | 6/1995 | European Pat. Off. . |
| 2633224 | 12/1989 | France . |

*Primary Examiner*—J. Casimer Jacyna
*Assistant Examiner*—Steven O. Douglas
*Attorney, Agent, or Firm*—Spencer & Frank

[57] ABSTRACT

Filling adaptor for a fuel tank, including a tubular body having a first open end communicating upstream with the filling orifice and a second open end communicating downstream with the filler pipe, the tubular body comprising downstream an internally frustoconical final portion whose cross-section decreases in the downstream direction, the cone vertex angle of which is no greater than 10° and the smallest internal diameter of which is equal to or slightly greater than the external diameter of the spout of the filler nozzle.

9 Claims, 2 Drawing Sheets

FILLING ADAPTOR FOR A FUEL TANK

FIELD OF THE INVENTION

The invention relates to a filling adaptor for a fuel tank, in particular for a motor vehicle.

TECHNOLOGY REVIEW

In particular when they are made of thermoplastic, fuel tanks currently have shapes and fastening positions which are more and more specifically tailored to their intended purpose, especially when they are intended for motor vehicles.

By corollary, the volume available for the filler pipe in the vicinity of the vehicle is becoming more and more restricted, and entails routes which, a priori, do not promote flow of the fuel. This being the case, these routes may in contrast promote splashes of fuel towards the user during filling and premature triggering of the device incorporated with the nozzle to prevent overfilling.

Furthermore, the application of increasingly stringent environmental standards demands that the gases which have to be displaced from the tank when it is filled be optimally channelled, with a view to treating them or even possibly recovering them.

Document EP 0,621,153 A1 describes a filling adaptor for a fuel tank, in particular for unleaded petrol, including a tubular body of frustoconical shape which has a moving flap at its downstream end and is extended by a semicylindrical channel optionally terminated by a transverse stop.

A device of this type allows the unleaded petrol nozzle to be guided longitudinally into the filler pipe of the tank. However, it does not make it possible fully and reliably to position the nozzle laterally and hold it during filling. To this end, it requires the combination of other means, for example the simultaneous use on the filling adaptor, or on the actual orifice of the filler pipe, of additional elements (pins, rings, etc.) which add to the complexity of the device and to the possibility that it will not operate optimally.

Furthermore, this device does not make it possible to protect the nozzle over its entire periphery from droplets of fuel which may be sprayed onto it and lead to premature triggering of the device incorporated with the nozzle to prevent overfilling.

SUMMARY OF THE INVENTION

On this basis, the subject of the invention is a filling adaptor for a fuel tank which makes it possible, in simple, complete and reliable fashion, to position and hold the fuel nozzle when the tank is being filled, in particular minimizing the risks of splashes of fuel towards the user and premature triggering of the device incorporated with the nozzle to prevent overfilling.

DETAILED DESCRIPTION OF THE INVENTION

Figure 1:
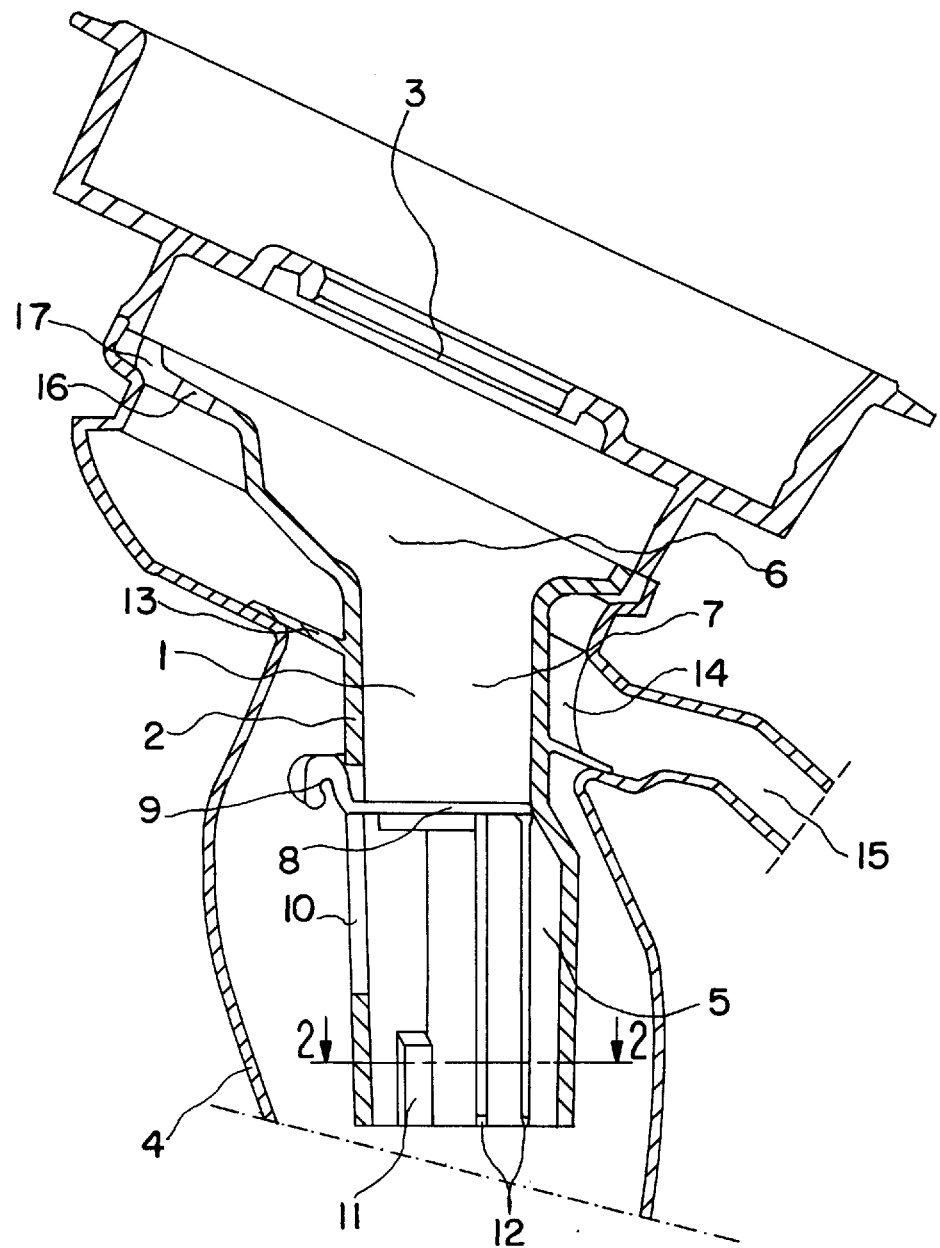
FIG. 1 represents a cross-sectional view of a filling adaptor according to the invention.

To this end, the invention relates to a filling adaptor for a fuel tank, including a tubular body having a first open end communicating upstream with the filling orifice and a second open end communicating downstream with the filler pipe, which is characterized in that, downstream, the tubular body comprises an internally frustoconical final portion whose cross-section decreases in the downstream direction, the cone vertex angle of which is no greater than 10° and the smallest internal diameter of which is equal to or slightly greater than the external diameter of the spout of the filler nozzle.

The filling adaptor is intended to be fixed onto the filler pipe of the tank, at its filling orifice or near to this orifice.

The adaptor is associated with filling a fuel tank. In particular, the adaptor is associated with filling a fuel tank of a vehicle, and yet more particularly a motor vehicle.

Most often, the filling adaptor also comprises, upstream, an entry region whose cross-section decreases in the downstream direction, the largest internal diameter of which is very substantially greater than the external diameter of the spout of a filler nozzle which is to be inserted therein, and the smallest internal diameter of which remains greater than the external diameter of the said spout. This entry region allows the user to insert the nozzle, without undue concentration, and allows the nozzle to be oriented with ease with a view to positioning it. The dimensions of this entry region already make it possible to prevent further insertion of nozzles which do not fit and which would deliver fuel which is inappropriate, in particular, for the engine which is to be supplied. In particular, this entry region already makes it possible, where appropriate, to insert further into the filling adaptor any nozzle other than a nozzle delivering unleaded petrol. The shape of this entry region is not more precisely dictated. In particular, it may be of conical form.

The cone vertex angle of the internal frustoconical final portion is no greater than 10°. Preferably, it is no greater than 5°. Yet more preferably, it is no greater than 3°.

The internally frustoconical final portion is long enough to allow precise positioning and full and reliable holding of the filler nozzle merely on the basis of the last part of its spout. In particular, the internally frustoconical final portion has a length of at least 10 mm. More particularly, it has a length of at least 20 mm. Excellent results have been obtained with a length of at least 30 mm.

By virtue of its dimensions and the small cone vertex angle, the internally frustoconical final portion allows precise positioning and full and reliable holding of the filler nozzle merely on the basis of the last part of its spout, independently of its curvature and without the need to combine other elements of the nozzle or of the adaptor, such as pins or rings, in order to achieve this effect. Further to the simplification which it affords, the fact that elements of this type are not employed furthermore avoids wear and possible damage, in particular to the filling adaptor.

By virtue of the internally frustoconical final portion fully surrounding the nozzle during filling, the filling adaptor protects the nozzle over its entire periphery against possible spraying of fuel and for this reason prevents premature triggering of the device incorporated with the nozzle to prevent overfilling.

Advantageously, the tubular body comprises an internally frustoconical intermediate portion whose cross-section decreases in the downstream direction, the axis of which corresponds substantially to the axis of the internally frustoconical final portion and the smallest internal diameter of which is greater than the external diameter of the spout of the filler nozzle.

In this context, the term "intermediate" is intended to mean that the portion in question is situated in the tubular body upstream of the internally frustoconical final portion and, where appropriate, downstream of the entry region.

The cone vertex angle of the internally frustoconical intermediate portion should be tailored to the adaptor and to the filler nozzle. In particular, this angle is no greater than 18°. Even more particularly, it is no greater than 5°.

In view of the fact that the cross-section of the intermediate portion and of the final portion decreases in the downstream direction, the mean diameter of the intermediate portion is greater than the mean diameter of the final portion. For this reason, since production of the intermediate portion, for example by moulding a thermoplastic, is easier and the risk of the filler nozzle becoming jammed therein is less, the cone vertex angle of the intermediate portion may even be less than the cone vertex angle of the final portion.

The two internally frustoconical portions may or may not be adjacent. Advantageously, they are adjacent.

Advantageously, the tubular body comprises a stop at its downstream end. This stop may be longitudinal or transverse. It prevents further insertion of the nozzle into the filling adaptor and thus contributes to its optimum longitudinal positioning.

In an advantageous embodiment, the internally frustoconical final portion is provided, over at least a part of its length and over at least a part of its periphery, with a series of circularly spaced longitudinal ribs whose ends at least partly define the internal diameter of the said portion. The number of ribs may clearly be tailored to the specific case. Their circular spacing may or may not be regular. They may run over all or part of the length of the portion in question. Advantageously, they run at least over the downstream part of the portion in question. Preferably, they run over the entire length of the portion in question.

The ends of the ribs thus at least partly define the bearing surface for the last part of the spout of the filler nozzle, in particular reducing friction of the spout on the bearing surface. Furthermore, limiting the contact surface area between the spout and its bearing zone reduces the risks of the possible formation of a film of fuel which could, on the one hand, rise back towards the user and, on the other hand, lead to premature triggering of the device incorporated with the nozzle to prevent overfilling.

In particular, the tubular body comprises an outer flange intended to interact with a part of the inner surface of the filler pipe so as, on the one hand, to prevent, during filling, fuel from rising up and substantially any gas from being discharged through the pipe to the filling orifice and, on the other hand, to define a space in the upper part of the pipe without interaction with the entering flow of fuel.

Thus, by preventing fuel from rising up towards the filling orifice through the filler pipe during filling, splashes of fuel towards the user are prevented.

Similarly, by preventing substantially any discharge of gases through the filler pipe to the filling orifice during filling, turbulence entraining droplets of fuel is avoided at the end of the spout of the filler nozzle, which may lead to premature triggering of the device incorporated with the nozzle to prevent overfilling.

In this context, the term "gas" is intended to denote essentially the air and the fuel vapour contained in the tank when it is being filled.

Advantageously, the gases emerging from the tank when it is being filled are discharged through the space defined in the upper part of the filler pipe.

Preferably, the gases discharged from the tank when it is being filled are fed into the space defined in the upper part of the filler pipe via a circuit which is different from the filler pipe, at least in its upper part. Yet more preferably, this circuit is entirely different from the filler pipe.

Again therefore, during filling, the entrainment of droplets of fuel which could be splashed towards the user is prevented.

The gases fed into the space defined in the upper part of the filler pipe may, at this point, be ideally channelled towards the filling orifice from which they can be discharged outwards or sucked back in with a view to preventing them from being discharged into the environment. To this end as well, the substantial absence of fuel droplets entrained with the gases constitutes a substantial advantage.

The filler adaptor may be used in combination with tanks for various fuels. In particular, it may be used in combination with tanks for leaded or unleaded petrol, or for diesel.

In the case of an unleaded petrol tank, it is well known that the filler adaptor includes an entry region followed by a movable flap valve which is normally held by elastic means in the closed position and is opened when a filler nozzle of appropriate dimensions is inserted.

As mentioned above, the possible entry region of the tubular body already makes it possible to prevent further insertion of a filler nozzle of inappropriate dimensions.

A movable flap valve may therefore be positioned in the filler adaptor, downstream of the said entry region. Preferably, it is positioned in the internally frustoconical final portion. Yet more preferably, it is positioned at the entry of this internally frustoconical final portion.

The filling adaptor advantageously comprises, in the internally frustoconical final portion of the tubular body, a flap valve which can move about a spindle substantially perpendicular to the axis of the internally frustoconical final portion, the said flap valve being normally returned by elastic means into the closed position and being opened when the nozzle for filling the tank is inserted, while being accommodated in a suitably shaped cavity provided for this purpose in the internally frustoconical final part.

Preferably, the flap valve is of a shape such that and/or includes at least one pad such that, when this flap valve is open and accommodated in the suitably shaped cavity intended for this purpose, the said flap valve and/or the said pad at least partly ensure continuity of shape with the adjacent internally frustoconical portion.

Thus, the functions of positioning and holding the nozzle during filling are completely fulfilled by the interaction of the flap valve and/or of the pad.

The tubular body may be made of any material known for this purpose. In particular, it is made of plastic, and more preferably still of thermoplastic.

The tubular body is advantageously made integrally.

Particularly advantageously, the tubular body is made integrally of plastic.

In a particular embodiment, the filling adaptor is made integrally.

Figure 2:
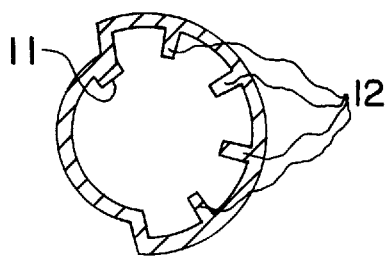
FIG. 2 represents a section along 2—2 in FIG. 1.

The invention is illustrated, without implying any limitation, by the following figures:

FIG. 1 represents a cross-sectional view of a filling adaptor according to the invention;

FIG. 2 represents a section along 2—2 in FIG. 1.

The filling adaptor 1 according to FIG. 1 includes a tubular body 2 having a first open end communicating upstream with the filling orifice 3 of the tank and a second open end communicating downstream with the filler pipe 4 of the tank, the tubular body comprising, downstream, an internally frustoconical final portion 5 whose cross-section decreases in the downstream direction, the cone vertex angle of which is 3° and the smallest internal diameter of which is slightly greater than the external diameter of the spout of the filling nozzle.

Upstream, the filling adaptor 1 also comprises an entry region 6 whose cross-section decreases in the downstream direction, the largest internal diameter of which is very substantially greater than the external diameter of the spout of a filler nozzle which is to be inserted therein, and the smallest internal diameter of which remains greater than the external diameter of the said spout.

The tubular body also comprises an internally frustoconical intermediate portion 7 whose cross-section decreases in the downstream direction, the axis of which corresponds to the axis of the internally frustoconical final portion 5, the cone vertex angle of which is 1.3°, and the smallest internal diameter of which is greater than the external diameter of the spout of a filling nozzle which is to be inserted therein.

The intermediate portion 7 is adjacent to the final portion 5.

The filling adaptor represented being intended for an unleaded petrol tank, the tubular body comprises a flap valve 8 which can move about a spindle 9 substantially perpendicular to the axis of the internally frustoconical final portion of the tubular body, the said flap valve being returned by elastic means into the closed position and being able to open when the nozzle for filling the tank is inserted, by being accommodated in a suitably shaped cavity 10 provided for this purpose in the internally frustoconical final part of the tubular body.

At its downstream end, the tubular body 2 furthermore comprises a longitudinal stop 11.

Longitudinal ribs 12 are also provided over the entire length of the internally frustoconical final portion, these ribs being regularly spaced circularly over a part of its periphery.

The tubular body furthermore comprises an outer flange 13 intended to interact with a part of the inner surface of the filler pipe so as, on the one hand, to prevent, during filling, fuel from rising up and substantially any gas from being discharged through the filler pipe to the filling orifice and, on the other hand, to define a space 14 in the upper part of the pipe without interaction with the entering flow of fuel.

During filling, the gases discharged from the tank are fed into the space 14 via a degassing circuit 15 entirely different from the filler tube. From this space 14, they are channelled towards the filling orifice through openings 16 provided for this purpose in the part 17 intended to allow the filling adaptor to be fastened onto the filler pipe.

FIG. 2 represents a section of the filling adaptor along 2—2, in the internally frustoconical final portion of the tubular body. In particular, it illustrates the ribs 12 regularly spaced circularly over a part of its periphery.

We claim:

1. A filling adaptor for a fuel tank, including a tubular body having a first open end communicating upstream with a filling orifice and a second open end communicating downstream with a filler pipe, said tubular body having an internally frustoconical final portion whose cross-section decreases in a downstream direction, a cone vertex angle which is no greater than 10° and a smallest internal diameter which is equal to or slightly greater than an external diameter of a spout of a filler nozzle to be inserted into the adaptor, the adaptor further comprising a stop at a downstream end of the tubular body for preventing further insertion of the filler nozzle into the adaptor.

2. The filling adaptor according to claim 1, wherein the internally frustoconical final portion has a length of at least 10 mm.

3. The filling adaptor according to claim 1, wherein the tubular body comprises an internally frustoconical intermediate portion whose cross-section decreases in the downstream direction, an axis of which corresponds substantially to an axis of the internally frustoconical final portion and a smallest internal diameter of which is greater than the external diameter of the spout of the filler nozzle.

4. The filling adaptor according claim 1, wherein the internally frustoconical final portion includes, over at least a part of its length and over at least a part of its periphery, with a series of circularly spaced longitudinal ribs whose ends at least partly define an internal diameter of the internally frustoconical final portion.

5. The filling adaptor according to claim 1, including a spindle substantially perpendicular to an axis of the internally frustoconical final portion, and in the internally frustoconical final portion, a flap valve adapted to move about the spindle, the flap valve being normally returned by elastic means into a closed position and being opened when the filler nozzle is inserted, while being accommodated in a suitably shaped cavity defined for this purpose in the internally frustoconical final portion.

6. The filling adaptor according to claim 5, wherein the flap valve is configured such that, when this flap valve is open and accommodated in the suitably shaped cavity intended for this purpose, the flap valve at least partly ensures continuity of shape with the internally frustoconical final portion adjacent thereto.

7. The filling adaptor according to claim 5, wherein the flap valve includes at least one pad such that, when this flap valve is open and accommodated in the suitably shaped cavity intended for this purpose, the pad at least partly ensures continuity of shape with the internally frustoconical final portion adjacent thereto.

8. The filling adaptor according to claim 1, wherein the tubular body is made integrally of plastic.

9. A filling adaptor for a fuel tank, including a tubular body having a first open end communicating upstream with a filling orifice and a second open end communicating downstream with a filler pipe, said tubular body having an internally frustoconical final portion whose cross-section decreases in a downstream direction, a cone vertex angle which is no greater than 10° and a smallest internal diameter which is equal to or slightly greater than an external diameter of a spout of a filler nozzle to be inserted into the adaptor, the tubular body further comprising an outer flange intended to interact with a part of the inner surface of the filler pipe so as to prevent, during filling, fuel from rising up and substantially prevent any gas from being discharged through the pipe to the filling orifice and further to define a space in the upper part of the pipe without interaction with the entering flow of fuel.

* * * * *